May 26, 1936. W. J. KENNEY 2,042,008
WATER OUTLET AND SALT INLET DEVICE FOR WATER SOFTENERS
Filed Aug. 31, 1934
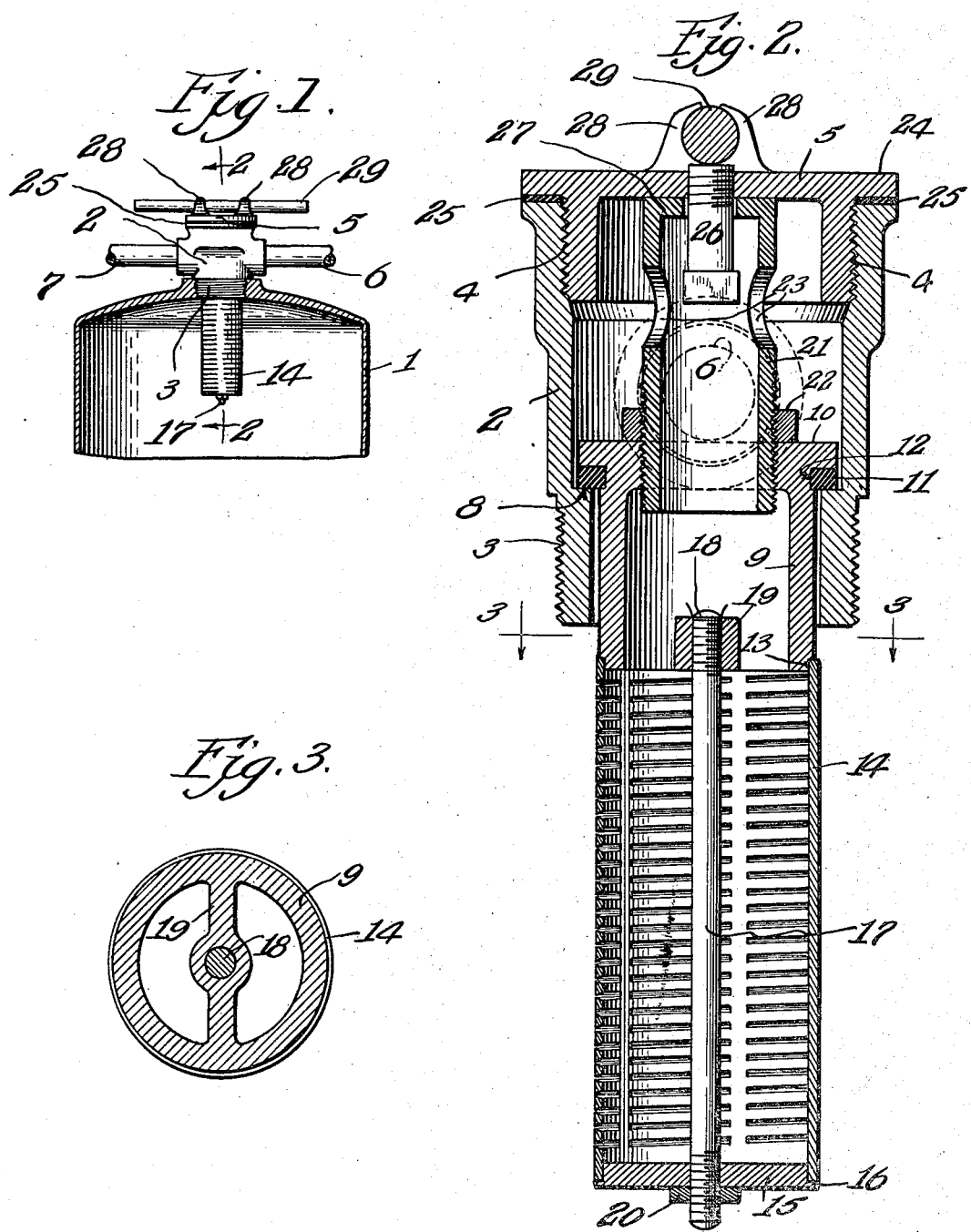

Patented May 26, 1936

2,042,008

UNITED STATES PATENT OFFICE 2,042,008

WATER OUTLET AND SALT INLET DEVICE FOR WATER SOFTENERS

William J. Kenney, Chicago, Ill.

Application August 31, 1934, Serial No. 742,210

4 Claims. (Cl. 210—24)

In water softeners of the zeolite type of the simplest form, it is necessary from time to time to introduce charges of salt, in solid form, into the tanks to regenerate the base exchange material. In the most successful softeners of this type it is common to provide the softener tank with a fitting through which the water flows both to the service line and to the waste pipe; the fitting being provided with a suitable detachable cap or closure that will permit a charge of salt to be dumped into the tank through the fitting. It is necessary that at some time during each cycle of operations of the softener the water flow in such a direction as to loosen up the bed of base exchange material in order to prevent it from becoming packed and permitting the water to cut definite passages through the same, reducing the efficiency of the softener. If the entire mass of base exchange material is not in a finely divided form, there will at least always be a considerable quantity of fine material which will rise in the water above the mineral bed with an up-flowing of water through the bed. Therefore, unless means are provided to prevent it, some of the mineral will escape from the tank during each cycle, thereby making it necessary to replenish the mineral from time to time. However, if the discharge outlet be provided with a suitable screen, the escape and consequent loss of mineral will be prevented. The screen must be of considerable superficial area to prevent it from being clogged, and it has been found that a so-called well screen depending from the outlet fitting into the tank satisfactorily serves the purpose. However, the salt cannot satisfactorily be introduced into the tank through the well screen, and therefore this screen must be readily removable for the purpose of permitting the salt to be poured into the tank.

The object of the present invention is to produce a simple and novel outlet fitting for a water softener tank, provided with an efficient screen to prevent escape of the mineral, and with a closure by which the screen will be located and secured in working position when the closure is applied and will be removed and thus provide a free passage for the entrance of salt when the closure is taken off.

The various features of novelty whereby my invention is characterized will hereinafter be pointed out with particularity in the claims; but, for a full understanding of the invention and of its objects and advantages, reference may be had to the following detailed description taken in connection with the accompanying drawing, wherein:

Figure 1 is a vertical section through the top of a water softener tank having one of my improved fittings which is shown in elevation; Fig. 2 is a section through the fitting on line 2—2 of Fig. 1, but on a much larger scale; and Fig. 3 is a section on line 3—3 of Fig. 2.

Referring to the drawing, 1 represents any usual or suitable water softener tank having at the top a neck through which water is discharged and through which salt may be introduced. In the arrangement shown, the neck is in the form of a more or less tubular casting 2 open at the top and at the bottom; the casting having at the lower end an externally screw-threaded section 3 adapted to be screwed into the top wall of the tank; and having at the upper end an internally screw-threaded section 4 into which is screwed a cap or closure 5. Connected to opposite sides of the member 2 are a service pipe 6 and a waste pipe 7. The bore of the member 2 is reduced in diameter in the lower part thereof to provide an internal upwardly-facing annular shoulder 8. There is arranged in the member 2 and projecting down through the lower end of the same a screened conduit element resting on and making a tight joint with said shoulder 8, so that no water can be discharged through the pipes 6 and 7 without passing through a screen. In the arrangement shown, the conduit device consists of several elements one of which is an inverted cup-shaped member 9 whose bottom wall is extended laterally to form a flange 10 that overlies the shoulder 8. Between the flange 10 and the shoulder 8 is a thick compressible gasket or packing ring 11 which may conveniently be made of rubber. This packing ring is preferably sprung into a shallow groove 12 surrounding the body portion of the member 9 adjacent to the flange. The extreme lower end of the member 9 is reduced in diameter somewhat, as indicated at 13, to provide a short neck that may be set into the upper end of the tubular well screen 14. Into the lower end of the well screen is set a disk 15 having a projecting annular flange 16 that rests against the end face of the screen. A rod 17 extends up through the disk 15 and it is screwed at its upper end, as indicated at 18, into a cross bar 19 extending diametrically across the lower end of the member 9 and forming part of that member. A nut 20 is screwed on the lower end of the rod 17 below the disk 15.

A long, hollow plug 21 is screwed into the upper end of the member 9 and is held against accidental displacement relatively to the member 9 by a lock nut 22. In the side wall of the member 21 are large holes 23. The parts are so proportioned that, when the cap or cover 5 is screwed down, it will engage with the upper end of the plug 21 and force the conduit device down so as to compress the packing or gasket 11. The cap or closure is provided with an annular flange 24 that overlies the upper end of the member 2; and, between the upper end of the member 2 and the flange 24, is placed a suitable gasket 25. The gasket 25 may be made comparatively thin and unyielding, since the easily compressible gasket 11 permits the cap to be screwed down until a tightly sealed joint has been produced between the cap and the member 2.

It is desirable that means be provided to lift the conduit device from the seat within the member 2, preferably without requiring any operation or act in addition to that of unscrewing the cap or closure. To this end, I have provided the cap 5 with a headed bolt 26 arranged axially thereof and screwed up into the same through the top wall 27 of the hollow plug 21. The bolt passes loosely through the top wall of the plug so that the cap may be turned freely independently of the conduit element. The parts are so proportioned, however, that before the cap becomes completely unscrewed the head of the bolt will engage with the under side of the wall 27 on the hollow plug and thereafter the unscrewing movement of the cap exerts an upward pull on the plug and the conduit element as a whole, breaking the seal between the conduit element and the member 2, and permitting the conduit element to be lifted bodily out of the tank and laid aside with the cap. Consequently, when it is desired to introduce a charge of salt into the tank, the cap is simply unscrewed and lifted off, carrying the conduit element with it; the salt is deposited through the opening into the tank thus provided; and then the cap with the attached conduit element is replaced to remain in position until the next regenerating operation is to be performed.

The cap may conveniently be provided with a handle for turning the same by casting on the same lugs 28 arranged in pairs on opposite sides of the center of the cap, laying across the top of the cap a rod or bar 29 in position to rest in the saddle or cradle formed by the two pairs of lugs and then bending the free ends of the lugs of each pair inwardly toward each other and across the top of the bar or rod.

While I have described the improved fitting as applied to manually controlled water softeners, it will, of course, be understood that it may also be used to advantage in any other kind of softener; thereby permitting the screen to be easily removed for cleaning.

While I have illustrated and described with particularity only a single preferred form of my invention, I do not desire to be limited to the exact structural details thus illustrated and described; but intend to cover all forms and arrangements which come within the definitions of the invention constituting the appended claims.

I claim:
1. In combination, a tank having a tubular open-ended neck, said neck having an outlet in the side, an internal annular seat in the neck below said outlet and a second annular seat on the neck above said outlet, a rigid hollow conduit element provided at its lower end with a screen extending into the tank through said neck and having an annular shoulder above said internal seat, a thick, easily compressible gasket between said shoulder and the underlying seat, a screw cap on the outer end of said neck engaging with the outer end of said element to cause the aforesaid gasket to be compressed, and a second gasket between said cap and the outer annular shoulder on the said neck.

2. In combination, a tank having a tubular open-ended neck, said neck having an outlet in the side, an internal annular seat in the neck below said outlet and a second annular seat on the neck above said outlet, a rigid hollow conduit element provided at its lower end with a screen extending into the tank through said neck and having an annular shoulder above said internal seat, a thick, easily compressible gasket between said shoulder and the underlying seat, a screw cap on the outer end of said neck engaging with the outer end of said element to cause the aforesaid gasket to be compressed, a second gasket between said cap and the outer annular shoulder on the said neck, and a loose connection between said cap and said element permitting relative rotary movements thereof and causing the cap to lift said element after the cap has been partially unscrewed.

3. In combination, a tank having a tubular open-ended neck, said neck having an outlet in the side, an internal annular seat in the neck below said outlet, a rigid conduit element provided at its lower end with a screen extending into the tank through said neck and having an annular shoulder above said internal seat, a gasket between said shoulder and the underlying seat, a tubular, perforated plug screwed into the upper end of said conduit element, a screw cap on the outer end of said neck engaging with said plug to cause the aforesaid gasket to be compressed, and a second gasket between said cap and the outer end of the said neck.

4. In combination, a tank having a tubular open-ended neck, said neck having an outlet in the side, an internal annular seat in the neck below said outlet, a rigid conduit element provided at its lower end with a screen extending into the tank through said neck and having an annular shoulder above said internal seat, a gasket between said shoulder and the underlying seat, a screw cap on the outer end of said neck engaging with the outer end of said element to cause the aforesaid gasket to be compressed, a second gasket between said cap and the outer end of the said neck, and a loose connection between said cap and said element permitting relative rotary and limited longitudinal movements thereof and causing the cap to lift said element after the cap has been partially unscrewed.

WILLIAM J. KENNEY.